United States Patent
Subotincic

(10) Patent No.: US 9,272,421 B2
(45) Date of Patent: Mar. 1, 2016

(54) VISUALLY CONTROLLED END EFFECTOR

(71) Applicant: Milos Misha Subotincic, Toronto (CN)

(72) Inventor: Milos Misha Subotincic, Toronto (CN)

( * ) Notice: Subject to any disclaimer, the term of this patent is extended or adjusted under 35 U.S.C. 154(b) by 194 days.

(21) Appl. No.: 13/735,040

(22) Filed: Jan. 7, 2013

(65) Prior Publication Data

US 2014/0195053 A1 Jul. 10, 2014

(51) Int. Cl.
*B25J 9/00* (2006.01)
*B25J 9/16* (2006.01)
*B25J 15/06* (2006.01)
*B25J 19/02* (2006.01)

(52) U.S. Cl.
CPC .............. *B25J 9/1697* (2013.01); *B25J 9/0093* (2013.01); *B25J 15/0616* (2013.01); *B25J 19/023* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,741,567 A * | 5/1988 | Zimmer | ................... | B25J 15/02 271/92 |
| 5,370,216 A * | 12/1994 | Tsuruyama | ............ | B25J 9/1697 198/376 |
| 5,515,599 A * | 5/1996 | Best | ..................... | B23Q 1/5481 29/38 C |
| 5,980,184 A * | 11/1999 | Lust | ...................... | B29C 31/006 414/226.01 |
| 6,081,981 A * | 7/2000 | Demarest | ......... | A61B 17/06004 29/407.04 |
| 7,313,464 B1 * | 12/2007 | Perreault | ................ | B25J 9/1666 318/568.1 |
| 7,474,939 B2 * | 1/2009 | Oda | ........................ | B25J 9/1697 382/153 |
| 8,442,680 B2 * | 5/2013 | Orita | ..................... | B62D 57/032 180/8.2 |
| 8,473,094 B2 * | 6/2013 | Becker | .................. | B65G 47/914 294/65 |
| 2005/0226711 A1 * | 10/2005 | Schnoor | ............... | B25J 15/0616 414/736 |
| 2006/0038883 A1 * | 2/2006 | Knoedgen | .............. | H04N 17/00 348/92 |
| 2006/0090424 A1 * | 5/2006 | Tokarz | ..................... | B65B 5/105 53/448 |
| 2009/0114509 A1 * | 5/2009 | Lykkegaard | ............... | B64F 1/32 198/617 |
| 2010/0004778 A1 * | 1/2010 | Arimatsu | ................ | B25J 9/1697 700/214 |
| 2010/0135760 A1 * | 6/2010 | Hjornet | ................. | B25J 15/0616 414/744.8 |
| 2012/0205928 A1 * | 8/2012 | La Rovere | ........... | B25J 15/0616 294/183 |
| 2013/0346348 A1 * | 12/2013 | Buehler | ................. | B25J 9/0087 706/12 |
| 2014/0046471 A1 * | 2/2014 | Bamford | .............. | G05B 19/048 700/110 |

* cited by examiner

*Primary Examiner* — Jonathan L Sample
(74) *Attorney, Agent, or Firm* — Leech Tishman Fuscaldo & Lampl; Ivam Posey, Esq.

(57) ABSTRACT

A visually controlled end effector is disclosed. The end effector comprises two or more operational members capable of picking up one or more randomly placed items. A crank is capable of actuation by a robot to orient a first one of said two or more operational members to pick up a first one of said one or more randomly placed items. The crank is further capable of actuation by the robot to orient a second one of said two or more operational members to pick up a second one of said one or more randomly placed items. The crank is further capable of orienting the first and second ones of the said two or more operational members for placement of the first and second ones of said randomly placed items into a desired oriented condition. A time savings of three robot transfers is thus made over prior art systems that transferred each individual product one by one.

15 Claims, 2 Drawing Sheets

VISUALLY CONTROLLED END EFFECTOR

FIELD OF THE INVENTION

A visually controlled end effector is disclosed. Specifically, a vision system allows a robot to select randomly placed products on a conveyer belt while keeping previously picked products in a known relative condition.

BACKGROUND OF THE INVENTION

More powerful and accurate cameras are a boon to end-users of industrial robotics. Vision guidance systems are able to capture very accurate three-dimensional locations with just one camera according to Doug Erlemann, Business Development Manager with Baumer Ltd. (Southington, Conn.). Erlemann sees more accurate software, more rugged equipment and cameras with features that alleviate lighting problems. Cameras with automatic gain are more accurate and robust. Vision guidance systems take into account more than just vision calculations and robot calculations, but are tied together in the overall system.

Likewise, Brian Carpenter, Software Engineer with Kawasaki Robotics (USA) Inc. (Wixom, Mich.), sees more accurate vision guidance systems for robotics. He states that, recently, more single camera three-dimensional systems are available. Resolution and accuracy improvements to stereoscopic systems have increased and do not require calibration and can accommodate different working distances.

Mr. Carpenter says that stereoscopic vision guidance systems allow more precise depth measurement. Camera systems are capable of locating objects as well as tracking and predicting their location while moving.

Vision guidance systems are utilized by end-users as a feedback device for generating very accurate frames and tools. Robot-mounted cameras and the images they generate refine an object's position through triangulation, providing for tremendous accuracies. Robots operating within six degrees of freedom are a perfect match with three-dimensional vision-guided solutions.

Due to increasing economic demand and competition, manufacturers are producing products at higher and higher rates. In order to keep up with these increasing production rates, robotic solutions must provide efficient ways to transfer products at the end of the production process from a randomly distributed condition into a sorted condition.

Steve Prehn, Vision Product Manager at FANUC Robotics America Corp. (Rochester Hills, Mich.), states that robust locational systems have the flexibility to quickly adapt to new parts as they are presented to the robot and provide accurate results to have them engage with new parts. Increased processing power allows integrators to go after markets that would be too difficult otherwise.

Assembly applications on the micro and nano-levels are among the new markets for robotics served by enhancements to vision guidance systems. Guidance systems accurately locate very small objects or zoom in to validate positions very precisely. When looking at very small fields of view, resolution goes to the micron range. Mr. Prehn notes that end-users use vision guidance systems to validate and correct for positional inaccuracies over the robot's working area.

Charles Ridley, Material Handling Service Manager with PAR Systems Inc. (Shoreview, Minn.) also talks about the role of robotic vision guidance systems in micro-assembly applications. He states that the challenges with micro-assembly are similar to other robotic vision applications. Ensuring that the robot chosen for the application has the repeatability and accuracy to handle the tolerances that come with a micro application is key. The vision guidance system must have a higher resolution.

Vision guidance systems require calibration with the robot to ensure proper positioning when that robot performs its tasks, says Greg Garmann, Technology Advancement Manager with Yaskawa America Inc.'s Motoman Robotics Division (Miamisburg, Ohio). He states that calibrating multiple camera systems between the robotic space and the vision space so that the robot can understand what the vision camera sees is important. Many applications require variable focal lengths and end-users want automatic focus to determine the depth or distance the guidance camera is from objects.

Garmann comments that end-users must recalibrate the vision system occasionally. When the focus is changed, that also changes the field of view and the calibration of the camera system to the robot. End-users want automatic focus so the guidance system can understand different focal lengths.

Calibration issues are important to end-users of Comau Robotics' systems (Southfield, Mich.) says Process Technology Director, Joe Cyrek. With advancements in computing power, systems allow for robot guidance in six degrees of freedom with one camera and cable without calibration. That advancement is significant. Cyrek adds that end-users want no calibration and simplicity in vision guidance systems. A single camera, cable, a simple interface without the need for calibration equals increased mean time between failures and decreased mean time to recovery, and fast set up.

Cyrek comments that algorithms and their application into robot guidance solutions have changed the perception of robot guidance from complicated to simple, allowing for more ways to use it.

Nicholas Hunt of Automotive Technology Support Group Manager at ABB Inc. (Auburn Hills, Mich.) states that he sees more light with structured wavefronts coming of age for three-dimensional surface scanning applications. The result requires processing massive amounts of data very quickly. New processors provide the necessary speed to fit the demands of production throughput. Hunt stresses the need for good calibration between the robot tool center point and the camera, or calibration between the camera and the work cell.

Thus, many robotic sorting applications currently use machine vision technology to scan a product's orientation on a moving transport surface or conveyer. The machine vision software and controller provide information to the robot controller to instruct the robot to re-orient the product in a desired position. This new re-oriented position is more conducive to packaging or further production processes that will need to take place prior to shipping the product to market.

While the use of machine vision technology is not new, it has traditionally been used for moving individual products on each robot transfer cycle. Any recent attempts to transfer multiple randomly placed items in a single transfer and re-orient them into a more easily manipulated fashion have failed to keep end effector weight to acceptable levels that still allow maintaining high robot transfer speeds.

The advantage of success in producing such a light-weight system would be to reduce the number of time consuming robot cycles between each pick and place. By first picking several products prior to transferring them to the receptacle into a sorted condition can significantly reduce robot transfer time. Large production cost savings can result.

None of the prior devices allow for the efficient transfer of multiple randomly placed items in a weight-manageable single transfer and re-orientation of them into a more easily manipulated fashion. Thus an end effector tool solving the aforementioned problems is desired.

SUMMARY OF THE INVENTION

In order to solve the problems and shortcomings of the prior art, a visually controlled end effector. According to a preferred embodiment, an end effector, comprises two or more operational members capable of picking up one or more randomly placed items; a crank capable of actuation by a robot to orient a first one of said two or more operational members to pick up a first one of said one or more randomly placed items; the crank further capable of actuation by the robot to orient a second one of said two or more operational members to pick up a second one of said one or more randomly placed items; and the crank further capable of orienting the first and second ones of the said two or more operational members for placement of the first and second ones of said randomly placed items at the same time into a desired oriented condition.

According to another preferred embodiment, a robot comprises a scanning camera; a scanning camera controller capable of causing the scanning camera to scan a plurality of randomly placed items; a robot controller for controlling orientation of a plurality of operational members capable of picking up the randomly placed items according to information received from the scanning camera; the robot controller capable of orienting a first one of said plurality of operational members to pick up a first one of said plurality of randomly placed items according to the information received from the scanning camera; the robot controller further capable of orienting a second one of said plurality of operational members to pick up a second one of said plurality of randomly placed items; and the robot controller further capable of orienting the first and second ones of the plurality of operational members for placement of the first and second ones of said randomly placed items at the same time into a desired oriented condition.

DETAILED DESCRIPTION OF THE PREFERRED EMBODIMENTS

For the purpose of illustrating the invention, there is shown in the accompanying drawings several embodiments of the invention. However, it should be understood by those of ordinary skill in the art that the invention is not limited to the precise arrangements and instrumentalities shown therein and described below.

According to one embodiment, a visually controlled end effector allows a robot to select randomly placed products on a conveyer belt while keeping previously picked products in a known relative condition.

Figure 1:
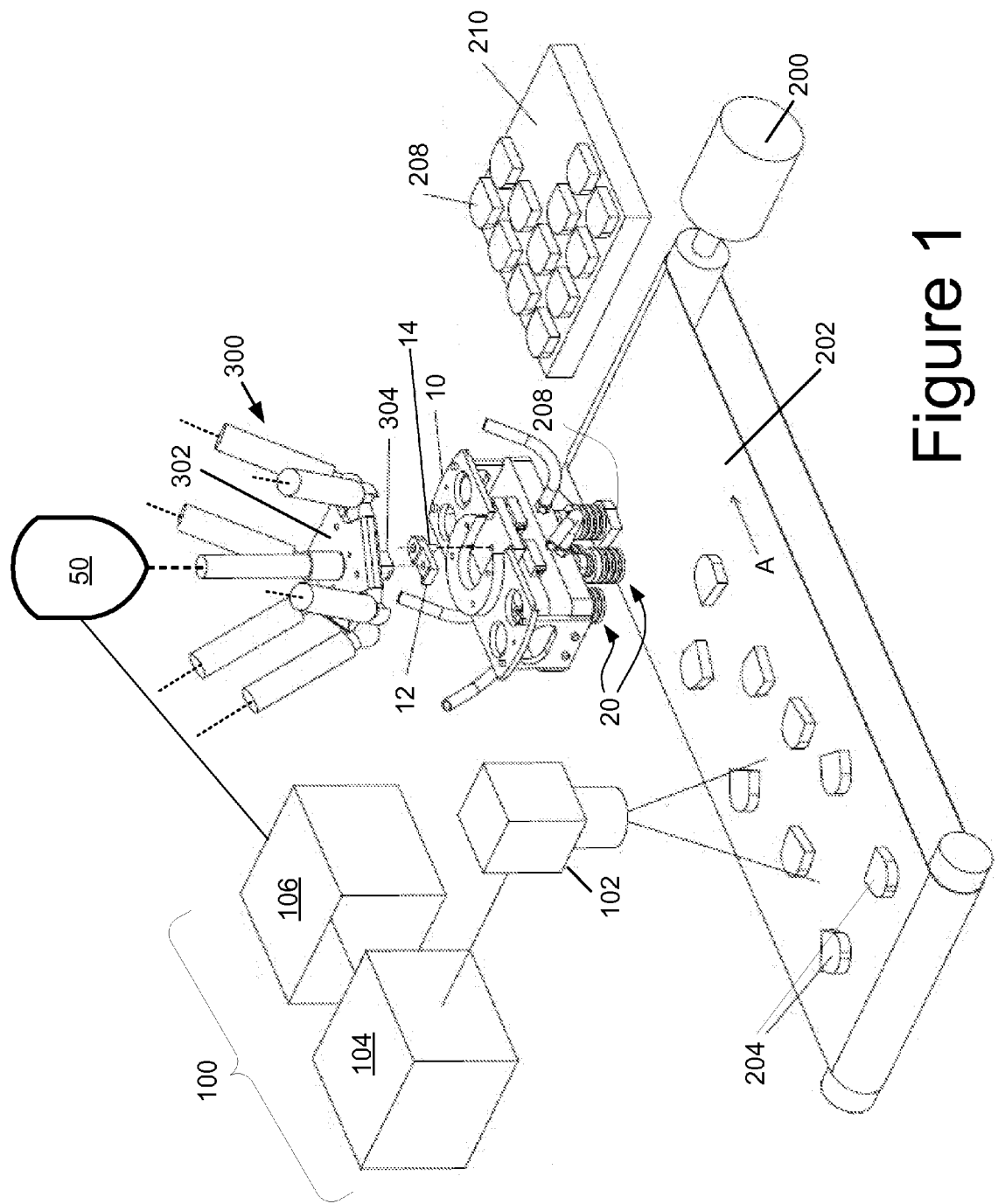
FIG. 1 is a diagrammatic left perspective view of a partially exploded robot controller, robot end of arm, and end effector.

With reference to FIG. 1, a diagrammatic left perspective view of a partially exploded robot controller, robot end of arm, and end effector is shown according to one embodiment. In the example embodiment of FIG. 1, a motor 200 may turn a conveyer belt 202 in direction A. The belt, for example, may carry randomly placed products or items 204 in direction A. The products may include, by way of example and not by way of limitation, candy bars that were manufactured and placed on the conveyer belt 202 for packaging, automotive parts, bottles, plastic wear, food products, produce, toys, or any types of items 204 that are able to be picked up off a conveyer belt 202. Although the examples provided in the drawings and herein throughout suggest a system for picking up items 204 off of a conveyer belt 202, those skilled in the art would understand that the system may be used to pick up items 204 off of any surface, still or moving.

The end effector 10, also called an end effector tool or end-of-arm-tool (eoat), may be mounted to the underside of a robot wrist plate 302 at the end of a robot arm and wrist 300. In the center of the robot wrist 300 there may be an output shaft 304 which may be controlled by a robot controller 106. The robot controller 106, along with a scanning camera 102 and scanning camera controller 104, comprise a vision system 100. Information from the vision system 100 allows a robot 50 to select a randomly placed item 204 and keep previously picked items 208 in a known relative condition area 210, i.e., on a tray or in a box. However, those skilled in the art would realize that the previously picked items 208 may be organized into a box, shipping crate, or other placing area.

A actuation mechanism may comprise a crank 12 attached to the rotating shaft 304 of the robot 50 with a vertically positioned eccentric driver shaft 14 that may be mounted, attached to, or engaged with, the underside of the robot output shaft 304. When the robot 50 processes the information from the vision system 100, the output shaft 304 may be turned by the robot axis to re-orient the pickup members 20. In one embodiment, the pickup members 20 may all be re-oriented at exactly the same time for picking up the randomly picked items 204 or placing the previously picked items 208. In other embodiments, just one or more, or some of the pickup members 20 may be re-oriented together.

Figure 2:
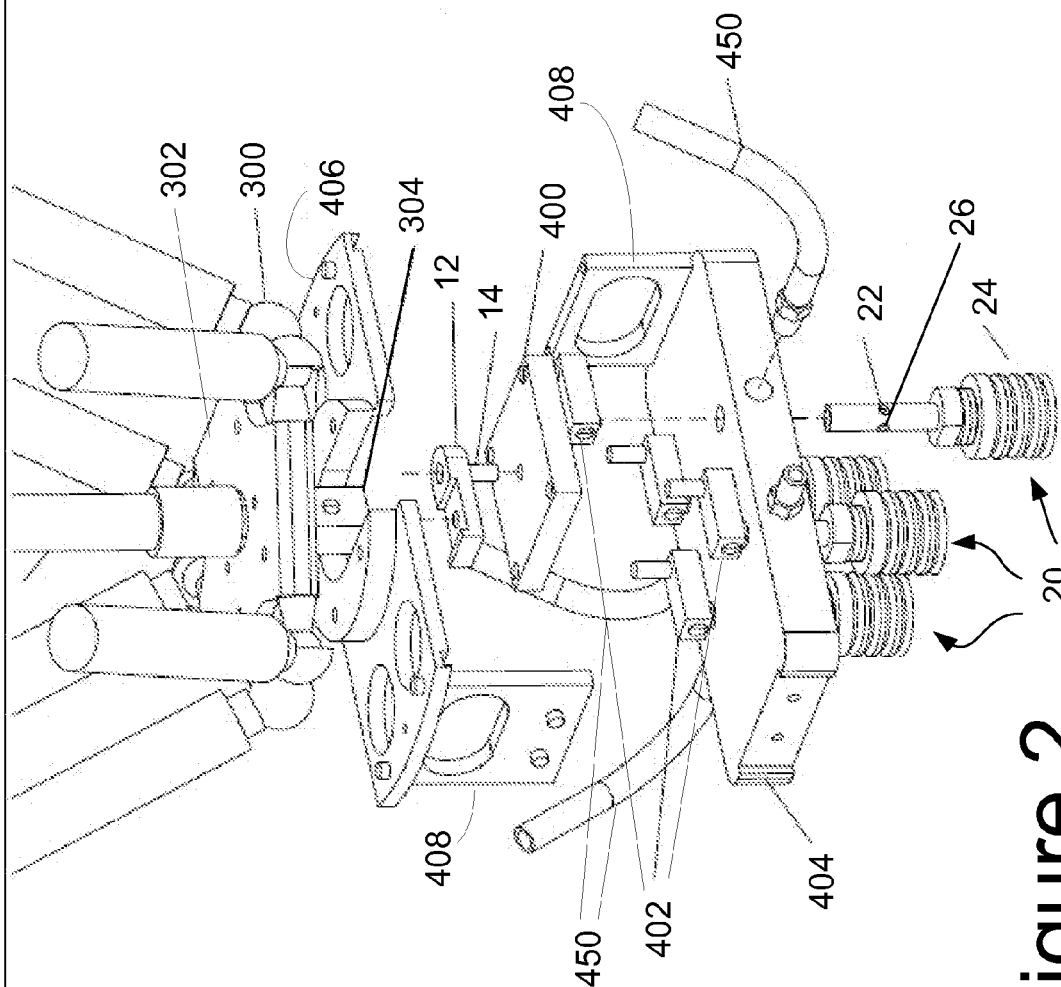
FIG. 2 is a left perspective exploded view of the end effector of the embodiment of FIG. 1.

With reference to FIG. 2, a left perspective exploded view of the end effector 10 of the embodiment of FIG. 1 is shown. Each operational member 20 may comprise a rotary shaft 22 and a suction cup 24 to create enough vacuum to pick up and hold an item 204, 208. The rotary shaft 22 of the operational member 20 is inserted through a hole in a rotary shaft support 404. The rotary shaft support 404 may be connected to a mounting plate 406, through two brackets 408, walls, or other side plates. The mounting plate 406 may mount to the robot end of arm 300. In one embodiment, the mounting plate 406 may be attached to the robot wrist plate 302.

An eccentrically floating driver plate 400 may replicate the angle of the crank 12 and driver shaft 14 to cause a driven crank 402 for each operational member 20 to turn accordingly. This may allow a re-oriented rotation about the center of each randomly placed item 204 to prevent an unbalanced item 204 from flinging off due to high rotation speeds. In one embodiment, each driven crank 402 may have the same pivot-to-shaft radius so that each member may mimic the shaft angle of the robot output shaft 304.

In one embodiment, the number of pickup members on the eoat 10 may be customized to each application. In the example shown in FIGS. 1 and 2, there are four operational members 20 that may be indirectly connected on the driver plate 400, and that each may rotate at exactly the same angle, replicating the output from the robot 50 axis. These pickup or operational members 20 can be arranged in any pattern or spacing and yet they may copy the same angular movement of the robot output shaft 304.

Once a complete re-oriented payload is ready, the robot 50 can then transfer it to a known position in the known relative condition area 210 (such as the tray in FIG. 1) for further processing or directly into a package container. It is during this last robot transfer cycle that a final rotation of the robot output shaft 304 may impart a final known desired condition to the orientation of each product on the eoat 10. For example, when four operational members 20 are used, this final robot transfer may thus be made only once instead of four times. A time savings of three robot transfers is thus made over the old system of transferring each individual product (one by one).

Vacuum is supplied individually to each operational member 20 via flexible hoses 450. The shaft 22 of each operational member 20 may be hollow with a sealed top, and have one or more holes 26 in the side to provide a path for suction provided to the operational members 20 from the vacuum hoses 450. In other embodiments (not shown) the vacuum hose 450 could be attached directly to the support shaft 22. In one embodiment, the robot 50 may be controlled by the robot controller 106 to individually activate suction in each vacuum hose 450 at just the moment of pickup of the targeted randomly placed item 204. This way, a pickup of only the desired item 204 can be made without wasting vacuum in the other operational members 20 not being used to pickup an item 204 at that instant. In one embodiment, only the vacuum hoses 450 that continue to hold previously selected items 208 waiting for placement in the known relative condition area 210 remain activated as well as vacuum hose 450 being used to pick up a next randomly placed item 204. At the moment of final transfer, all vacuum hoses 450 can be switched off or deactivated at once or individually depending on the sequence required for each product placement. This causes each product to drop down into its final intended location in the known relative condition area(s) 210.

Those of skill in the art would recognize that known technologies may be used for the scanning camera 102, scanning camera controller 104, and robot controller 106. Such systems that are available and that can be readily adopted to work with the robot 50 and end effector 10 can be purchased from, for example, FANUC Robotics America Corp. of Rochester Hills, Mich., Baumer Ltd. of Southington, Conn., Kawasaki Robotics (USA) Inc. of Wixom, Mich., PAR Systems Inc. of Shoreview, Minn., Comau Robotics' systems of Southfield, Mich., and other manufacturers of scanning cameras, and camera and robot controllers. These systems have the ability of identifying objects, and orienting a robot into a position to pickup the object. Adding the end effector 10 disclosed herein provides the ability to pickup multiple items 204 that are randomly placed as viewed by the scanning camera 104.

The various embodiments described above are provided by way of illustration only and should not be construed to limit the invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed is:

1. An end effector, comprising:
   a. two or more operational members configured for picking up one or more randomly placed items; and
   b. an actuator mechanism, the actuator mechanism comprising:
      i. a crank configured for actuation by a robot to actuate a driver plate of the end effector to orient a first one of said two or more operational members to pick up a first one of said one or more randomly placed items;
      ii. the crank further configured for actuation by the robot to actuate the driver plate of the end effector to orient a second one of said two or more operational members to pick up a second one of said one or more randomly placed items; and
      iii. the crank further configured for actuating the driver plate of the end effector to orient the first and second ones of the said two or more operational members for placement of the first and second ones of said randomly placed items into a desired oriented condition.

2. The end effector of claim 1, further comprising a robot output shaft that is configured to actuate the crank.

3. The end effector of claim 1, wherein each operational member comprises a rotary shaft and suction cup, the suction cup configured to provide a vacuum to pick up and hold one of said randomly placed items.

4. The end effector of claim 3, further comprising a rotary shaft support through which each operational member is inserted.

5. The end effector of claim 4, further comprising a vacuum hose for each operational member configured to provide the vacuum for each suction cup.

6. The end effector of claim 1, wherein each operational member is configured to orient according to information received regarding the randomly placed items from a scanning camera and robot controller.

7. The end effector of claim 1, wherein the randomly placed items are picked from a moving conveyor belt.

8. A robot comprising:
   a. a scanning camera;
   b. a scanning camera controller capable of causing the scanning camera to scan a plurality of randomly placed items;
   c. a plurality of operational members configured to pick up one or more of the plurality of randomly placed items;
   d. an end effector mounted to the robot, the end effector comprising a driver plate on which the plurality of operational members are indirectly connected, the driver plate configured to orient each of the plurality of operational members;
   e. a robot controller configured to actuate the driver plate of the end effector for controlling orientation of the plurality of operational members configured for picking up the one or more of the plurality of randomly placed items according to information received from the scanning camera;
   f. the robot controller configured to actuate the driver plate of the end effector for orienting a first one of said plurality of operational members to pick up a first one of said plurality of randomly placed items;
   g. the robot controller configured to actuate the driver plate of the end effector for orienting a second one of said plurality of operational members to pick up a second one of said plurality of randomly placed items; and
   h. the robot controller further configured to actuate the driver plate of the end effector for orienting the first and second ones of the plurality of operational members for placement of the first and second ones of said randomly placed items into a desired oriented condition.

9. The robot of claim 8, further comprising a robot output shaft that is configured to actuate a crank to actuate the driver plate.

10. The robot of claim 9, wherein each operational member comprises a rotary shaft and suction cup, the suction cup providing a vacuum to pick up and hold one of said randomly placed items.

11. The robot of claim 10, the end effector further comprising a rotary shaft support through which each operational member is inserted.

12. The robot of claim 11, the end effector further comprising a vacuum hose for each operational member configured to provide the vacuum for each suction cup.

13. The robot of claim 8, wherein the plurality of randomly placed items are picked from a moving conveyor belt.

14. The robot of claim 8, wherein each operational member comprises a suction cup and shaft.

15. The robot of claim 14, the end effector further comprising a shaft support having an aperture for each operational member, each shaft inserted through the aperture for the operational member, each shaft fir fit into a driven crank, each driven crank configured for actuation by the driver plate.

* * * * *

UNITED STATES PATENT AND TRADEMARK OFFICE
CERTIFICATE OF CORRECTION

PATENT NO. : 9,272,421 B2
APPLICATION NO. : 13/735040
DATED : March 1, 2016
INVENTOR(S) : Milos Misha Subotincic Page 1 of 1

It is certified that error appears in the above-identified patent and that said Letters Patent is hereby corrected as shown below:

On the Title Page, at lines 4 and 5, replace:

"(71) Applicant: Milos Misha Subotincic, Toronto (CN)"

with

--(71) Applicant: Milos Misha Subotincic, Toronto (CA)--;

and

"(72) Inventor: Milos Misha Subotincic, Toronto (CN)"

with

--(72) Inventor: Milos Misha Subotincic, Toronto (CA)--.

Signed and Sealed this
Twenty-sixth Day of July, 2016

Michelle K. Lee
*Director of the United States Patent and Trademark Office*